United States Patent [19]

Markert

[11] 4,068,744
[45] Jan. 17, 1978

[54] FLOATATION AND ANCHORING MECHANISM FOR DISC BRAKE

[75] Inventor: Matthew Edward Markert, Medina, Ohio

[73] Assignee: The Bendix Corporation, South Bend, Ind.

[21] Appl. No.: 718,637

[22] Filed: Aug. 30, 1976

[51] Int. Cl.² ............................................. F16D 65/02
[52] U.S. Cl. .............................. 188/73.3; 188/205 R
[58] Field of Search .................. 188/72.4, 72.5, 72.1, 188/73.3, 73.6, 73.5, 370, 205 A, 205 R, 206 A, 206 R

[56] References Cited

U.S. PATENT DOCUMENTS

| | | | |
|---|---|---|---|
| 3,145,807 | 8/1964 | Desvignes et al. | 188/72.5 |
| 3,625,314 | 12/1971 | Rinker | 188/73.3 X |
| 3,708,043 | 1/1973 | Rath et al. | 188/73.3 |

FOREIGN PATENT DOCUMENTS

| | | | |
|---|---|---|---|
| 1,353,793 | 1/1964 | France | 188/73.3 |
| 1,207,328 | 9/1970 | United Kingdom | 188/73.3 |

Primary Examiner—Trygve M. Blix
Assistant Examiner—Douglas C. Butler
Attorney, Agent, or Firm—Ken C. Decker; William N. Antonis

[57] ABSTRACT

A disc brake is provided with a torque member having a pair of arms which define a recess which slidably receives one of the friction elements. The torque member and one friction element are designed so that braking torque is transmitted from the one friction element to the torque member through a primary abutment located on the lower edge of the recess, and a pair of secondary abutments. The other friction element is carried by a caliper which is slidably mounted on removable rails mounted on the upper end of the arms. The braking torque generated by the other friction element is transmitted through the caliper and the rails mounted on the other arm. Consequently, the braking torque is divided so that it is taken by several different portions of the torque member, thereby permitting a smaller and more efficient torque member.

9 Claims, 3 Drawing Figures

FLOATATION AND ANCHORING MECHANISM FOR DISC BRAKE

BACKGROUND OF THE INVENTION

This invention relates to a heavy duty disc brake for automotive vehicles.

Automotive disc brakes must be relatively compact in order to fit in the allocated space on a modern vehicle, yet must be capable of generating relatively high braking forces in order to generate sufficient braking torque to stop a vehicle. The problem is particularly acute on heavy duty vehicles, such as air-braked trucks which, when loaded, are much heavier than passenger cars and, therefore, require much larger brakes. Until now, disc brakes have been used almost exclusively on passenger cars and light trucks, but braking requirements require that disc brakes be used on heavier vehicles, such as air-braked trucks, in the near future. The present invention relates to a disc brake particularly adapted for heavy duty vehicles, such as air-braked trucks, but is not limited to such an application and may be used advantageously in a disc brake for any type of vehicle.

SUMMARY OF THE INVENTION

Therefore, an important object of my invention is to provide a relatively compact heavy duty disc brake which is capable of generating relatively large braking forces.

Another important object is to minimize the size and weight of the torque member or anchor plate used in a heavy disc brake by providing a torque transmission system between the friction elements and the torque member which splits the braking forces into components which are taken by various portions of the torque member.

Still another important object of my invention is to provide a heavy duty disc brake in which removable rails are mounted on the torque member to slidably mount the caliper, thereby facilitating assembly and disassembly of the brake while insuring smooth sliding action of the caliper.

DETAILED DESCRIPTION

Figure 1:
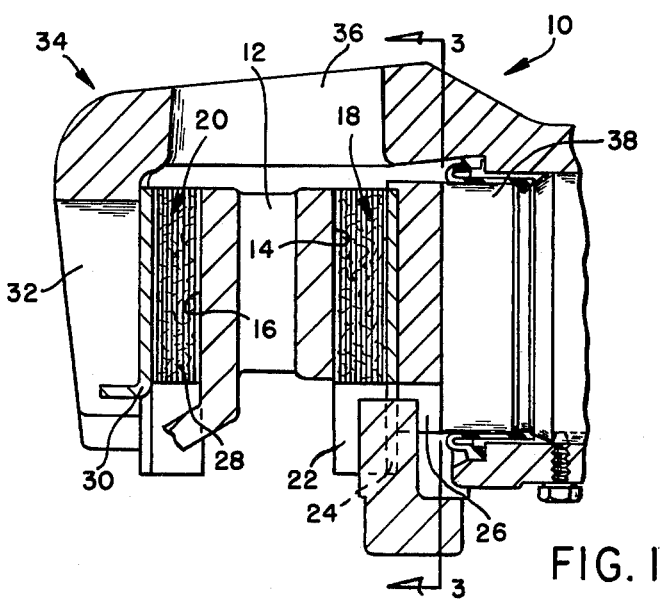
FIG. 1 is a fragmentary longitudinal cross-sectional view of a disc brake made pursuant to the teachings of my present invention.

Referring now to the drawings, a disc brake generally indicated by the numeral 10 includes a rotor 12 which is mounted for rotation with a member to be braked, such as a vehicle wheel, and which is provided with a pair of opposed friction faces 14, 16. A pair of friction elements, 18, 20 are located adjacent the friction faces 14 and 16, respectively. The friction element 18 consists of friction material 22 mounted on a backing plate 24, which is attached to a conventional torque plate 26. The torque plate 26 increases the width of the backing plate holding the friction material, so that the friction element 18 can anchor on the torque member in a manner to be described hereinafter. The friction element 20 consists of friction material 28 mounted on backing plate 30 which is secured to inwardly extending portion 32 of a caliper generally indicated by the numeral 34 in a manner well known to those skilled in the art. The caliper 34 consists of the inwardly extending portion 32 which is disposed substantially parallel to the friction face 16, a bridge portion 36 which traverses the periphery of the rotor 12, and an actuator housing 38 which extends substantially parallel to the friction face 14. The actuator housing 38 houses the brake actuating mechanism which is adapted to urge the friction element 18 into frictional engagement with the friction face 14, and may be any type of mechanism well known to those skilled in the art, such as a conventional hydraulic fluid motor actuator, or an air brake actuating mechanism disclosed in U.S. Pat. application Ser. No. 564,507 filed Apr. 2, 1975, and now abandoned owned by the assignee of the present invention and incorporated herein by reference.

The caliper 34 is slidably mounted on a torque member generally indicated by the numeral 40. The caliper 34 is therefore able to slide parallel to the axis of the rotation of the rotor, so that when the actuator mechanism urges the friction element 18 against the friction face 14, the sliding action of the caliper will transmit the actuating force through the bridge portion of 36 and the inwardly extending portion 32 to thereby also urge the friction element 20 into braking engagement with the friction face 16. The torque member 40 is rigidly mounted to a nonrotative portion of the vehicle, such as the axle flange. The torque member 40 comprises a pair of circumferentially spaced arms 42, 44, which are symmetrical about an axis of symmetry, the upper ends of which terminate in portions 46, 48 which extend substantially parallel to the axis of rotation of the rotor. The main portion of the arms 42, 44, of course, extend substantially parallel to the friction face 14 of the rotor. A pair of rails 50, 52 are mounted on the portions 46, 48 and are of sufficient length so that they extend across the periphery of the rotor 12. Rails 50, 52 are provided with tongues 54, 56 which are received in grooves 58, 60 in the portions 46, 48 to thereby orient the rails 50 and 52 in a direction so that they are parallel with the axis of the rotation of the rotor. The rails 50, 52 are secured to the arms 42, 44 by conventional bolts 62, 64. Opposite edges of the caliper 34 are provided with grooves 66, 68 which slidably receive portions 70, 72 of the rails 50, 52 which project into the recess generally indicated by the numeral 74 defined between the arms 42, 44. Each of the grooves 66, 68 are comprised of two portions located on opposite sides of the rotor 12; for example, the groove 66 consists of a portion 76 on the actuator housing 38 and another portion 78 on the inwardly extending portion 32 of the caliper 34. This construction enables the rails 50, 52 to support the caliper 34 for sliding movement as described hereinabove.

Opposite edges of the recess 74 are defined by the facing surfaces 80, 82 of the arms 42, 44, and these surfaces are joined by bottom or joining edge 84. The friction element 18 is received in the recess 74 and is adapted to slide therein toward and away from the friction face 14 as the brake is applied and released. Torque is transferred directly from the friction element 18 to the torque member 40 through primary abutments 86, 88 on the joining edge 84 of the torque member 40. The primary abutments 86, 88 extend substantially parallel to the edges 80, 82 and cooperate with corresponding abutments on the friction element 18 to transfer torque from the friction element to the torque member. Since the friction element anchors on the primary abutments 86 and 88, a force couple is created during braking which is absorbed by secondary abutments 90, 92 on the arms 42, 44. However, only a portion of the force couple is absorbed by these secondary abutments. The friction element 18 is also provided with bearing surfaces 94, 96 on the upper edge 98 thereof which cooperate with corresponding bearing surfaces on the lower side of the rails 50, 52, respectively. The remaining portion of the aforementioned force couple is absorbed through the bearing surfaces 94, 96.

MODE OF OPERATION

Figure 2:
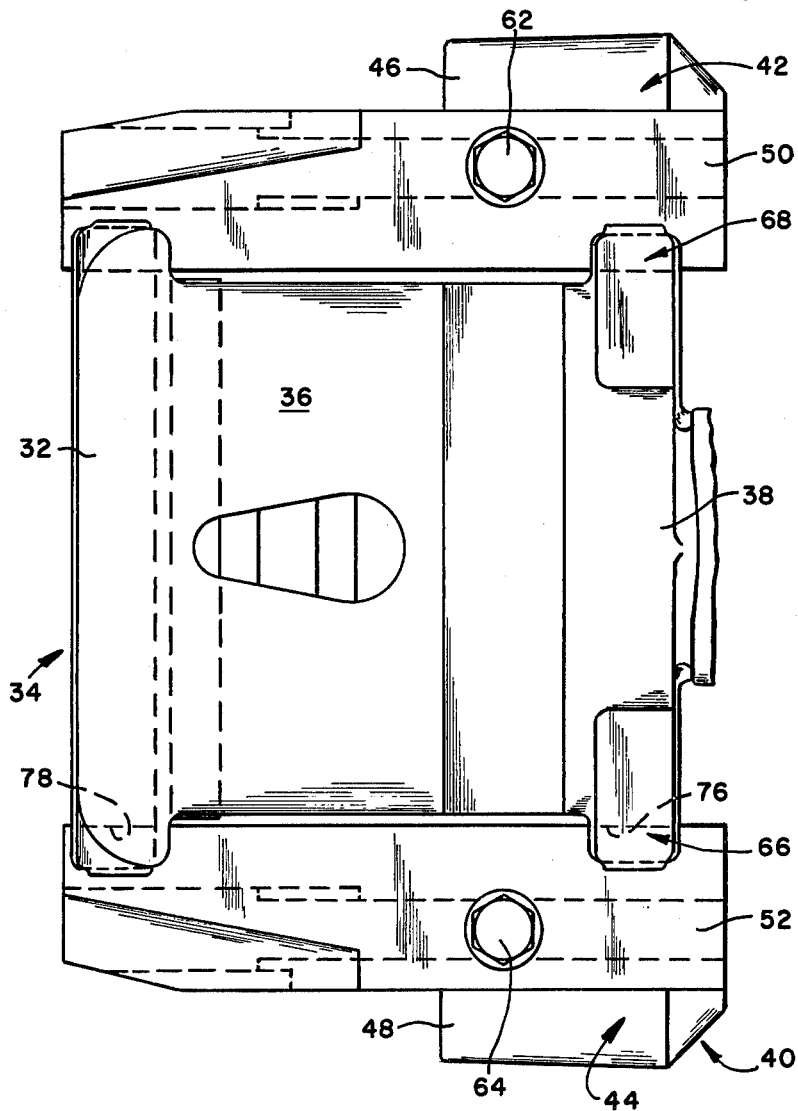
FIG. 2 is a fragmentary top plan view of the brake illustrated in FIG. 1.
Figure 3:
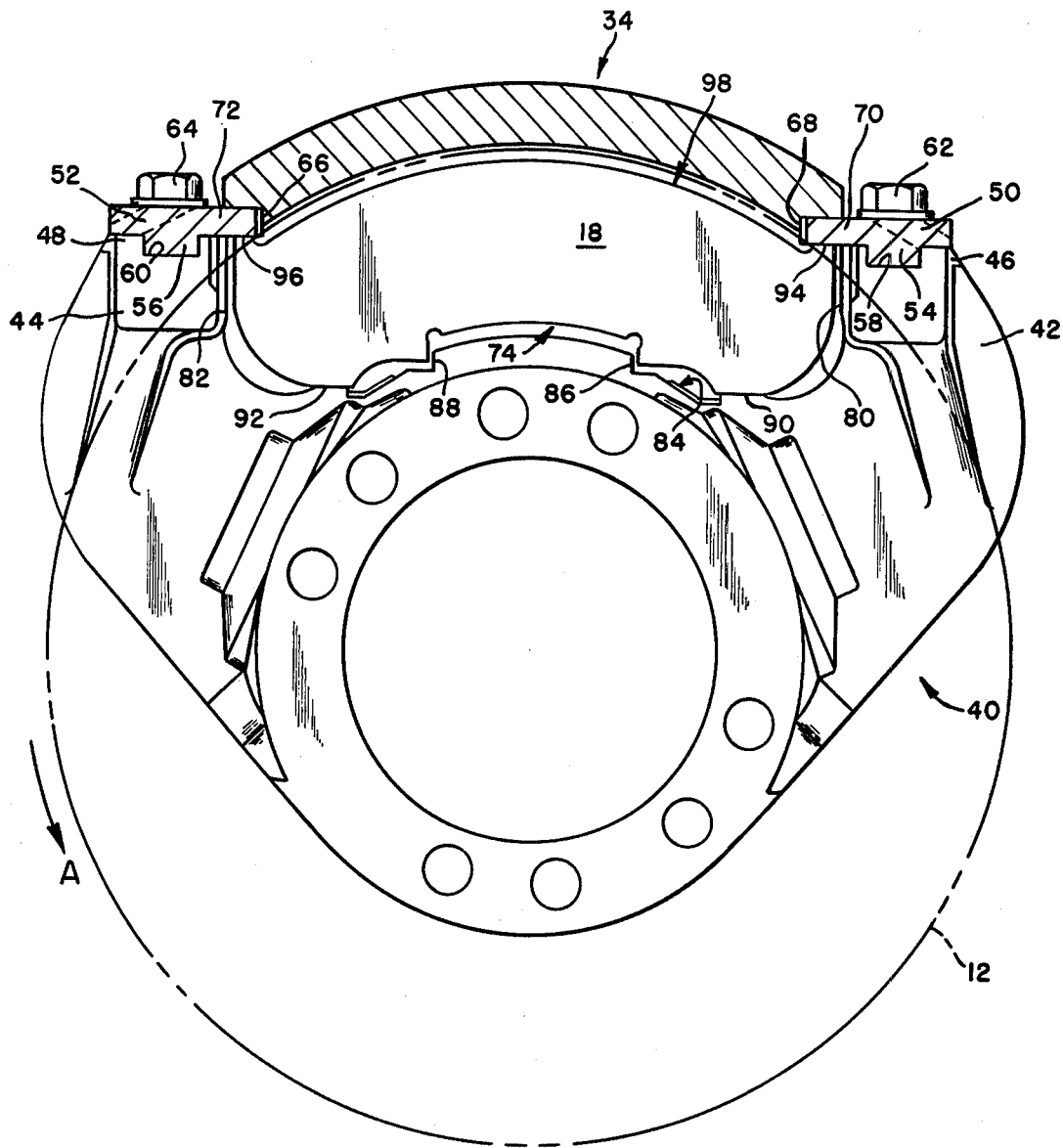
FIG. 3 is a cross-sectional view taken substantially along lines 3—3 of FIG. 1.

When a brake application is effected, the actuating mechanism housed within the actuating portion 38 of the caliper 34 urges the friction element 18 into braking engagement with the friction face 14. Because of the slidable connection between the caliper 34 and the torque member, braking forces generated by the actuating mechanism are transmitted through the bridge portion 36 and inwardly extending portion 32 to similarly urge the friction element 20 into braking engagement with the friction face 16. Engagement of the friction element 20 with the friction face 16 generates braking torque urging the caliper 34 downwardly viewing FIG. 2, so that the braking torque generated by the friction element 20 is transmitted to the arm 44 of the torque member 40 through the groove 66 and the rail 52, assuming rotation of the rotor in the counterclockwise direction as indicated by the arrow A. Engagement of the friction element 18 with the friction face 14 generates a braking torque which is transmitted directly to the torque member 40 through the primary abutment 86. However, a force couple will also be created by engagement of the friction element 18 of the friction face 14, which tends to rotate the friction element 18 in a counterclockwise direction in the plane of FIG. 3. This force couple is taken by the secondary abutments 92 and 94, thereby transmitting a portion of the force couple directly to the torque member 40 through the abutment 92 and another portion of the force couple to the torque member 40 through the secondary abutment 94 and the rail 50. Therefore, since the torque generated by the friction element 20 is taken through rail 52, and since the torque generated by friction element 18 is taken by the primary abutment 86 of the secondary abutments 92 and 94, the braking torque created by the brake application is transmitted to the torque member 40 through four widely separated abutments, thereby enabling the torque member to be made smaller and lighter in weight than prior art torque members. Similarly, if the brake application is effected during rotation of the rotor in the reverse direction to that indicated by the arrow A, the braking torque generated by the friction element 20 would be transmitted through the rail 50, and the braking torque generated by the friction element 18 would be transmitted through the primary abutment 88 and the secondary abutments 90 and 96.

I claim:

1. In a disc brake, a rotor mounted for rotation with a member to be braked, said rotor having a pair of opposed friction faces, a pair of friction elements disposed adjacent said friction faces and adapted to frictionally engage the latter when a brake application is effected, a torque member mounted adjacent said rotor, a caliper slidable on said torque member, said caliper bridging said rotor and cooperating with each of said friction elements to urge the latter into frictional engagement with said rotor, said torque member comprising a pair of circumferentially spaced arms defining a recess therebetween slidably receiving one of said friction elements, each of said arms having a facing edge facing the corresponding edge on the other arm, the facing edges of said arms defining the side edges of said recess, said torque member defining a joining edge interconnecting said side edges and defining the bottom edge of said recess, a primary abutment on said joining edge cooperating with a corresponding primary abutment on said friction element through which braking torque is transferred from the one friction element to the torque member, and a pair of secondary abutments on said torque member cooperating with a corresponding pair of secondary abutments on said one friction element, to restrain rotation of said one friction element relative to said torque member.

2. The invention of claim 1, one of said secondary abutments being located on said joining edge, the other of said secondary abutments on said torque member being located on one of said arms.

3. The invention of claim 1:
said arms being symmetrical about an axis of symmetry, said primary abutment on said torque member being located on said joining edge on one side of said axis of symmetry, one of said secondary abutment surfaces being located on said joining edge on the other side of said axis of symmetry, the other of said secondary abutments surfaces being located on one of said facing edges.

4. The invention of claim 1:
said primary abutment being located on said joining edge on one of said arms, one of said secondary abutments being located on said joining edge on the other of said arms, the other of said secondary abutments being located on the facing edge of said one arm.

5. The invention of claim 4:
said arms terminating in projections extending into said recess, said one friction element having a pair of bearing surfaces cooperating with said projections, said other secondary abutment being defined between by the projection on one of said arms and the corresponding bearing surface.

6. The invention of claim 5:
said one friction element having upper and lower edges, said bearing surfaces being located on circumferentially spaced portions on the upper edge of said one friction element.

7. The invention of claim 5:
said projections extending generally parallel to the axis of the rotation of the rotor;
said caliper having grooves on opposite edges thereof, said grooves slidably receiving corresponding projections whereby said projections slidably support said caliper for movement parallel to the axis of said rotor.

8. The invention of claim 7:
the other of said friction elements being carried by the caliper whereby the braking torque generated by engagement of said other friction element with the rotor during braking is transmitted through said caliper, the projection carried by the other of said arms, and the corresponding groove on the caliper.

9. In a disc brake, a rotor mounted for rotation with a member to be braked, said rotor having a pair of opposed friction faces, a pair of friction elements disposed adjacent said friction faces and adapted to frictionally engage the latter when a brake application is effected, a torque member mounted adjacent said rotor and having a pair of circumferentially spaced arms defining a recess therebetween, said recess having a pair of side edges defined by said arms and an edge joining said side edges, a caliper straddling said rotor and slidably mounted on said arms, one of said friction elements being mounted on said caliper, said one friction element anchoring through said caliper to one arm of the torque member, the other friction element being slidable in said recess and anchoring on a pair of abutment surfaces on said joining edge and a third abutment surface on the other arm when a brake application is effected.

* * * * *